US010378911B1

(12) United States Patent
Ledet

(10) Patent No.: US 10,378,911 B1
(45) Date of Patent: Aug. 13, 2019

(54) NAVIGATION APPLICATION PROVIDING COLLABORATIVE NAVIGATION INFORMATION

(71) Applicant: OPEN INVENTION NETWORK LLC, Durham, NC (US)

(72) Inventor: David Gerard Ledet, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 86 days.

(21) Appl. No.: 15/397,925

(22) Filed: Jan. 4, 2017

Related U.S. Application Data

(60) Provisional application No. 62/275,124, filed on Jan. 5, 2016.

(51) Int. Cl.
*G01C 21/34* (2006.01)
(52) U.S. Cl.
CPC ....... *G01C 21/343* (2013.01); *G01C 21/3484* (2013.01)
(58) Field of Classification Search
CPC .............. G01C 21/343; G01C 21/3484; G01C 21/3438; G01C 21/362; G01C 21/3641
See application file for complete search history.

(56) References Cited

U.S. PATENT DOCUMENTS

| | | | | |
|---|---|---|---|---|
| 8,860,587 | B2* | 10/2014 | Nordstrom | G08G 1/202 340/990 |
| 9,506,770 | B2* | 11/2016 | Ding | G06F 16/285 |
| 9,574,894 | B1* | 2/2017 | Karakotsios | G01C 21/3617 |
| 9,599,484 | B2* | 3/2017 | Bostick | G01C 21/3476 |
| 9,903,721 | B2* | 2/2018 | Choi | G01C 21/36 |
| 2008/0293430 | A1* | 11/2008 | Blom | G01C 21/3484 455/456.1 |
| 2009/0276154 | A1* | 11/2009 | Subramanian | G01C 21/20 701/469 |
| 2011/0046878 | A1* | 2/2011 | Sung | G01C 21/28 701/467 |
| 2016/0187141 | A1* | 6/2016 | Kulkarni | H04W 4/21 701/537 |
| 2016/0273930 | A1* | 9/2016 | Wada | G01C 21/3438 |
| 2017/0122756 | A1* | 5/2017 | Chen | G01C 21/3438 |
| 2017/0138749 | A1* | 5/2017 | Pan | G01C 21/3438 |

* cited by examiner

*Primary Examiner* — Nicholas Kiswanto

(57) ABSTRACT

Navigation applications may utilize various input data to offer route information and other suggested information. One example method may include initiating a navigation application on a first user device, identifying at least one destination of the navigation application, notifying a remote server of the at least one destination, receiving a first query from a second user device inquiring about the at least one destination, and transmitting a response comprising an identification of a first user profile associated with the first user device to the second user device.

17 Claims, 11 Drawing Sheets

NAVIGATION APPLICATION PROVIDING COLLABORATIVE NAVIGATION INFORMATION

CROSS-REFERENCE TO RELATED APPLICATIONS

This application claims priority to earlier filed provisional patent application No. 62/275,124 entitled "NAVIGATION", which was filed on Jan. 5, 2016, the entire contents of which are hereby incorporated by reference.

TECHNICAL FIELD OF THE APPLICATION

This application relates to monitored navigation and more specifically to utilizing predetermined information to create navigation routes, collaboration among users traveling to a common destination and to provide options and assistance to user devices during a navigation session.

BACKGROUND OF THE APPLICATION

There are numerous applications and devices which may be used to offer navigation assistance to users operating transport vehicles. Those devices are quite similar in that the destination is identified and the route is planned to assist the user with ensuring they maintain their route on the fastest and most available roads by avoiding traffic, smaller less common roads, etc. Some of the applications even offer updated traffic information and assistance with locating gas stations, restaurants, etc.

However, the limits on navigation tools are evident in that the goal is always to stay on course and not deviate during a navigation session. In reality, users are often traveling with a perspective on their surroundings that is beyond the exact instructions provided by a navigation route.

SUMMARY OF THE APPLICATION

One example embodiment may include a method that includes initiating a navigation application on a first user device, identifying at least one destination of the navigation application, notifying a remote server of the at least one destination, receiving a first query from a second user device inquiring about the at least one destination, and transmitting a response comprising an identification of a first user profile associated with the first user device to the second user device.

Another example embodiment may include an apparatus that includes a processor configured to initiate a navigation application on a first user device, identify at least one destination of the navigation application, notify a remote server of the at least one destination, a receiver configured to receive a first query from a second user device inquiring about the at least one destination, and a transmitter configured to transmit a response comprising an identification of a first user profile associated with the first user device to the second user device.

Still another example embodiment may include a non-transitory computer readable storage medium configured to store instructions that when executed cause a processor to perform initiating a navigation application on a first user device, identifying at least one destination of the navigation application, notifying a remote server of the at least one destination, receiving a first query from a second user device inquiring about the at least one destination, and transmitting a response comprising an identification of a first user profile associated with the first user device to the second user device.

Yet still another example embodiment may include a method that includes initiating a navigation application on a first user device, identifying at least one destination of the navigation application, notifying a remote server of the at least one destination, updating a first user profile to include the at least one destination, searching for at least one additional user profile associated with at least one additional user device with a matching destination, and transmitting a notification to the first user device of the at least one additional user profile.

Another example embodiment may include an apparatus that includes a processor configured to initiate a navigation application on a first user device, identify at least one destination of the navigation application, notify a remote server of the at least one destination, update a first user profile to include the at least one destination, and search for at least one additional user profile associated with at least one additional user device with a matching destination, and a transmitter configured to transmit a notification to the first user device of the at least one additional user profile.

Still yet another example embodiment may include a non-transitory computer readable storage medium configured to store instructions that when executed causes a processor to perform initiating a navigation application on a first user device, identifying at least one destination of the navigation application, notifying a remote server of the at least one destination, updating a first user profile to include the at least one destination, searching for at least one additional user profile associated with at least one additional user device with a matching destination, and transmitting a notification to the first user device of the at least one additional user profile.

DETAILED DESCRIPTION OF THE APPLICATION

Figure 1:
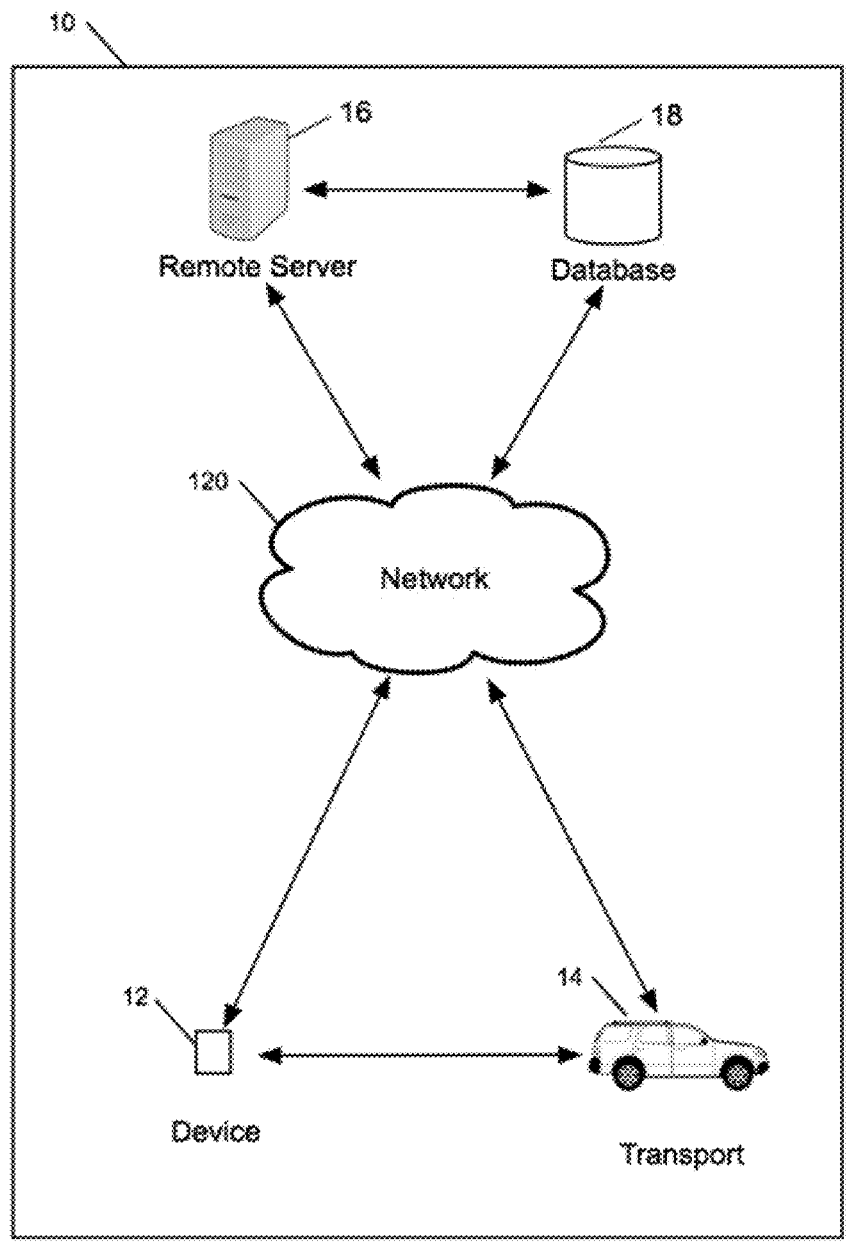
FIG. 1 illustrates a network diagram of a client device operating with a navigation application configuration according to example examples.

It will be readily understood that the components of the present application, as generally described and illustrated in the figures herein, may be arranged and designed in a wide variety of different configurations. Thus, the following detailed description of the examples of a method, apparatus, and system, as represented in the attached figures, is not intended to limit the scope of the application as claimed, but is merely representative of selected examples of the application.

The features, structures, or characteristics of the application described throughout this specification may be combined in any suitable manner in one or more examples. For example, the usage of the phrases "example examples", "some examples", or other similar language, throughout this specification refers to the fact that a particular feature, structure, or characteristic described in connection with the example may be included in at least one example of the present application. Thus, appearances of the phrases "example examples", "in some examples", "in other examples", or other similar language, throughout this specification do not necessarily all refer to the same group of examples, and the described features, structures, or characteristics may be combined in any suitable manner in one or more examples.

In addition, while the term "message" has been used in the description of examples of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary examples of the application, the application is not limited to a certain type of message, and the application is not limited to a certain type of signaling.

Example examples provide applications for navigation along a particular travel route, and more specifically determining intermediate destinations on the route to a final destination based on various characteristics of one or more users in a transport, such as a moving vehicle or other moving device configuration capable of offering a traveling service.

Other examples include an enhancement to navigation functionality, and more specifically enhancements to a navigation application that assists the user in navigating to a destination. There are at least two levels of assistance provided in the current disclosure. The first level of assistance adds additional navigational elements that are complementary to the normal navigation clues identified by a navigation application.

The second level of assistance offers the ability for the current application to functionally interwork with the navigation application providing additional assistance to the user when navigating to a destination. Also provided are holo-visual and thermal representations permitting for alternate displays so the user may obtain further data regarding the transport and/or current navigation. One or more of these levels can be used in conjunction with one another and/or contemporaneously so the functionality of one can be integrated with another.

The characteristics of the user may include one or more of acquaintances of the user as determined by the user's communication with others (i.e., emails, chat messages, etc.), interests as determined by examining the user's group membership(s), search history, purchase history, locations/stores visited, advertisements interacted with, and/or social network affiliations, etc. Also, user desires as determined by search history, items purchased, advertisements interacted with by a user profile, communication with others, etc., may be identified and used as data input parameters to offer a user options during a navigation session. Also, other characteristics of the user may be obtained via searching through the user's locally and remotely stored data.

The characteristics of the user may be determined by the application/program/software of the current application through analysis of local and remote systems. In another example of the current application, determinations are made via a processing entity to examine items that may be of interest to a user profile based on certain criteria. Example criterion may be the lowest price, for example, of gasoline along a particular route. An 'item' may be a non-final destination along a route in a transport and the non-final destination may be a business location on the route or near the route as part of an alternative route which offers fuel, a tourist attraction, a store, or any other similar location that is deemed potentially desirable to one or more of the users affiliated with the current route.

The current application also includes navigation along a route, and more specifically determining multiple routes to a destination and where those multiple routes may include destination(s) that are reflected in a user's characteristics. Those alternate routes may be depicted differently on a map. For example, colors of the route may indicate the user's level of interest. Furthermore, each of the alternate routes may be interacted with where details of that particular route are displayed along with the additional time it will take for the user to travel to that alternate route. The data pertaining to the rationale that the alternate route was selected may also be included in the data. The current application also may seek to notify other users of the alternate selected route when the application determines that the other users may also have an interest in that destination.

FIG. 1 displays a system diagram configuration 10 which may be used to provide data services to a transport during a navigation session according to example examples. The present application, in the form of software, for example, executes on a device 12, or is accessible by the device 12 via a different device (not shown) in a network 120 and/or a device communicably coupled to the network, such as a server 16 and/or database 18. The device 12 is referred to as a device capable of providing services to a first application. The device 12 may be a mobile device, a tablet computer, a laptop or desktop computer, a transport navigational computer, a wearable device, or any other similar or dissimilar device containing a processor and memory. The device may also be a gaming system, a DVD player, or any device that is normally utilized to consume media.

The application, such as in the form of software, for example, may reside on the device 12 that may be any of the above example devices or a mobile laptop device and/or a personal desktop computer or a mobile phone device or any other device containing a processor and memory. The device may be connected to the network 120, which may be the Internet or any other type of network. The device 12 may communicate with the network 120 and/or a transport 14 and the transport contains an internal device, such as a navigational system device 13, with a processor and memory, which may be used to provide navigation via an interface, which may be visual and/or audio in nature. The application executing on or within the transport 14 is henceforth referred to as the second application. The device 12 alternately may also operate within the transport 14.

The transport 14 may be a car, bus, train, motorcycle, airplane or any other type of moveable object normally used to transport human beings and/or objects. For example, the transport may be utilized to move people, objects such as goods or packages, or people and objects. The communication between the device 12 and remote elements (the network 120 and/or the transport 14) may be wired and/or wireless and occur through many types of communication protocols such as cellular, Bluetooth, Wi-Fi, or any other types of communication protocol permitting communication between computing devices at a short and/or long distance. The current application residing on the device 12, in the form of software, for example, or for use by the device 12 may be downloaded from the remote server 16 through the network 120.

The user of the application may interface with the device 12 and/or the transport 14 and connect through the network 120 to the remote server 16, which may be redundant, or be more than a single entity without deviating from the scope of the application. A database 18 may directly or indirectly connect to the remote server or connect remotely through the network 120 without deviating from the scope of the application.

The software application of the instant application (not shown) resides completely or partially on the device 12, which may be a mobile device and/or completely or partially on the transport 14, but may also reside on a user's desktop computer, a personal digital assistant (PDA), tablet computer, or any other device containing a processor, memory, and an operating system. In addition, the application may reside on either completely or partially on any one of the other elements in the system depicted in FIG. 1.

In one example, the current application may alter navigation of a user device navigation application. For instance, while the navigation instructions direct a user traveling along a route via a transport 14. The device 12 may be carried by the user, such as a mobile device that the user may be carrying, or the device may be part of the transport 14 such that the device may display notifications to the user through audio, images, video, etc. The device may determine intermediate destinations which are displayed on the user device interface through notifications from the device whether the device is a mobile device or a device that may be on the transport 14. The current application utilizes user profile characteristics compiled and stored in a user profile when determining aspects of the functionality. As a result, the functionality surrounding the determination of the user's characteristics may include various logging and storing operations necessary to compile a user profile which can provide information necessary to enact a suggested set of options during an active navigation session.

The navigation application includes a configuration module that permits a user to configure particular elements of the application. This configuration module permits the user to specify actions taken by the application and also permits the user to specify certain other actions. The configuration module also permits particular elements in the application to be configured by the user. The configuration module may be software residing in the client device 12, the navigation application 14, or any other element in the network architecture containing a processor and memory.

The device 12 may communicate with the network 120 and/or a transport 14 and the transport contains an internal device, such as a navigation system, with a processor and memory, which may be used to provide navigation via an interface, which may be visual and/or audio in nature. The application executing on a transport 14 is henceforth referred to as the second application. The device 12 alternately may operate within the transport 14. The current application executing on the device 12 and referred to as the first application may provide additional layered assistance to a mapping application executing on or within a transport 14, for example, a global positioning satellite (GPS) application, which may be referred to as a second application. The first application can execute on the device 12 and the second application can execute on the transport 14, such as a navigation system (not shown), in the transport 14. GPS functionality can be contained on one or more of the elements in the system 10.

The current application generally pertains to an enhancement to navigation functionality, and more specifically enhancements to a navigation application that assists the user in navigating to a destination. There are two levels of assistance provided. The first level of assistance offers the ability to be notified of other users whom are navigating to the same destination and/or a same or similar route, and may be near the user. The notification data describes the other person's transport details, current location. The user may then be able to find and follow the user along the route and/or to the destination.

A second level of assistance provides yet another notification that offers additional data and the user is able to connect with the other users in order to possibly communicate, for example, through chatting and/or calling with that user. Also disclosed is the ability for the vehicles to communicate with one another, adding a further level of the connection between the users. One or more of these levels can be used in conjunction with the other, contemporaneously with the other or the functionality of one can be integrated with another. The device 12 may communicate with the network 120 and/or a transport 14. The transport may contain an internal device, such as a navigation system, with a processor and memory, which may be used to provide navigation via an interface, which may be visual and/or audio in nature. The application executing on the transport 14 is referred to as the second application. The device 12 alternately may operate within the transport 14. The transport 14 may be a car, bus, train, motorcycle, airplane or any other type of moveable object normally used to transport human beings.

The current application executing on the device 12 and referred to as the first application may provide additional, layered assistance to a normally used mapping application executing on a transport 14, for example, a GPS application referred to as a second application. The first application can execute on the device 12 and the second application can execute on the transport 14, such as a navigational system (not shown), in the transport 14.

The first application and the second application may synchronize with one another. For example, one application may provide audio-based content, such as directions, while the other application, may receive input, commands, triggers, etc., from the one application and append additional audio-based content to the provided audio content, such as supplemental content or additional information. The provided and/or appended audio content may also be converted to text via speech-to-text algorithms which are widely available today such that the converted text is analyzed by an application and processed accordingly. The speech-to-text functionality may take effect in the client device 12.

In another example, the text may be appended to the textual directions of the second application. In another example, there is a link with the first and second applications via an application programming interface (API), such that the details of the overall navigation and the specific, immediate progress of the transport through the navigation, are determined, shared and/or updated. In another example, both of the above processes may be utilized to connect the first application and the second application's functionality. Other "connections" between the first application and the second application's functionality may also be utilized without deviating from the scope of the current application.

In another example, the full functionality of the navigation may exist entirely in the first application, or the second application without deviating from the scope of the current application. Another level of functionality is available to assist the user in navigation by informing the user of elements that may not be stationary. For example, other transports that may be heading to the same or similar geographical destination, and which are in the same geographical area as the user. This may provide the user with additional comfort in driving to a new destination by tracking or following another transport that is going to the same or a similar location.

Figure 2:
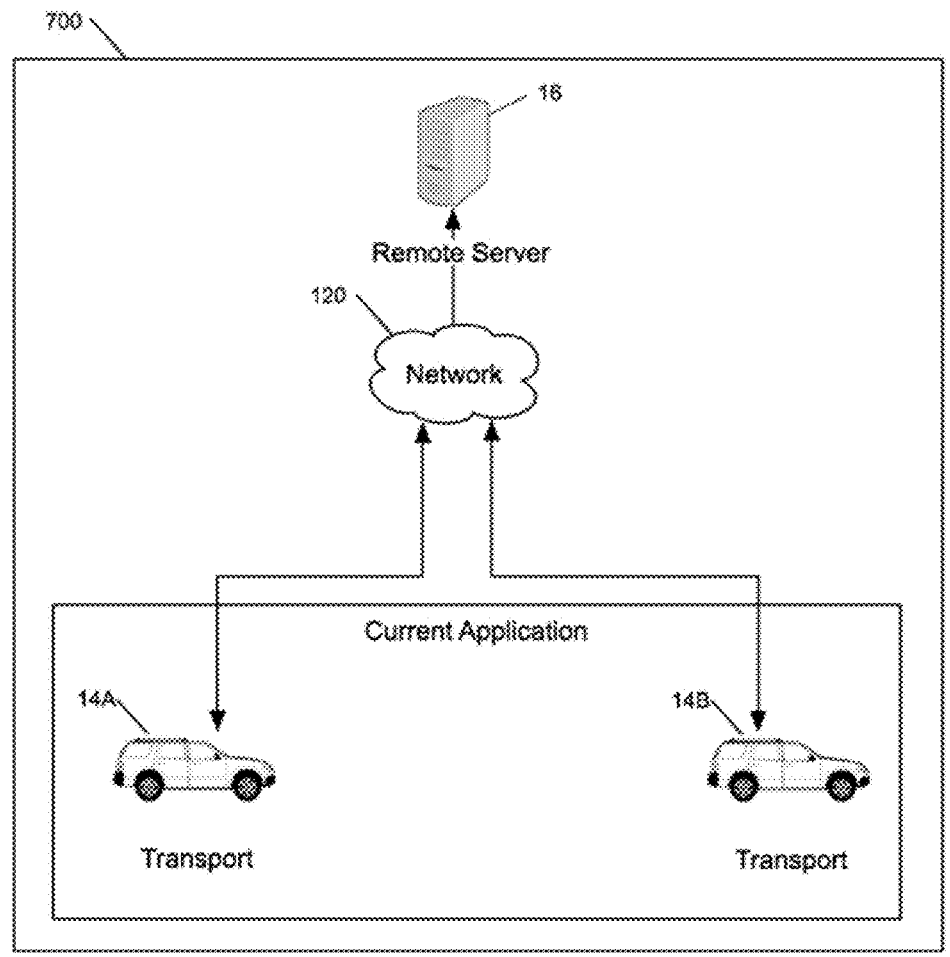
FIG. 2 illustrates a logic flow diagram of transports being tracked by a network according to example examples.

FIG. 2 illustrates the network established between two separate transports utilizing a navigation application. In this example, both users including user A and user B are utilizing the current application. For purposes of clarity, user B is seeking other users whom are using the application and whom are near the current location of user A. A remote server 16 stores the current location of the users of the application and all attributes of the navigation procedure of each of the users including destinations, current progress of the users through the navigation, etc. These elements are updated via the application through messages sent to the remote server, through the network 120, and may be stored at the remote server 16 or a communicably coupled database 18.

The current application executing on the user's device 12 and/or the transport 14 sends updates to the remote server 16 at regular intervals such that the remote server, at all times, contains the present location of the users of the current application. An "update location" message is sent from the device and/or transport to the remote server 16. The intervals at which these updates occur are hardcoded in the current application and may be set at determined intervals, such as when the transport has moved a number of feet, yards, meters, miles, etc., from a previous location.

In the example 700 of FIG. 2, a flow of logic includes two users user A 14a and user B 14B utilizing the current application on a device that is either operated by the user and/or which is connected to a transport, such that as the user moves then the device moves, and thus if the user is in a transport, the application tracks the transport. The current application, executing on device 12 is depicted as 14A for user A, and 14B for user B for visual simplicity. It is noted that the device 12 may be any device as indicated above containing a processor and memory.

A remote server 16 provides a central point of data storage and is considered a top level in the hierarchal layout of the flow of data such that the remote server processes all of the user interactions received from the current application and is routinely updated with the details of the users including the navigational details for any navigation performed via the user. Any details of a navigation via user A and/or user B are updated with a central location (i.e., remote server 16), and the querying of the current location and/or destination of a user may return the timely data. In another example, data may also be stored in a communicably coupled database so messaging through the remote server 16 and the database may occur directly or through the network 120.

Figure 3:
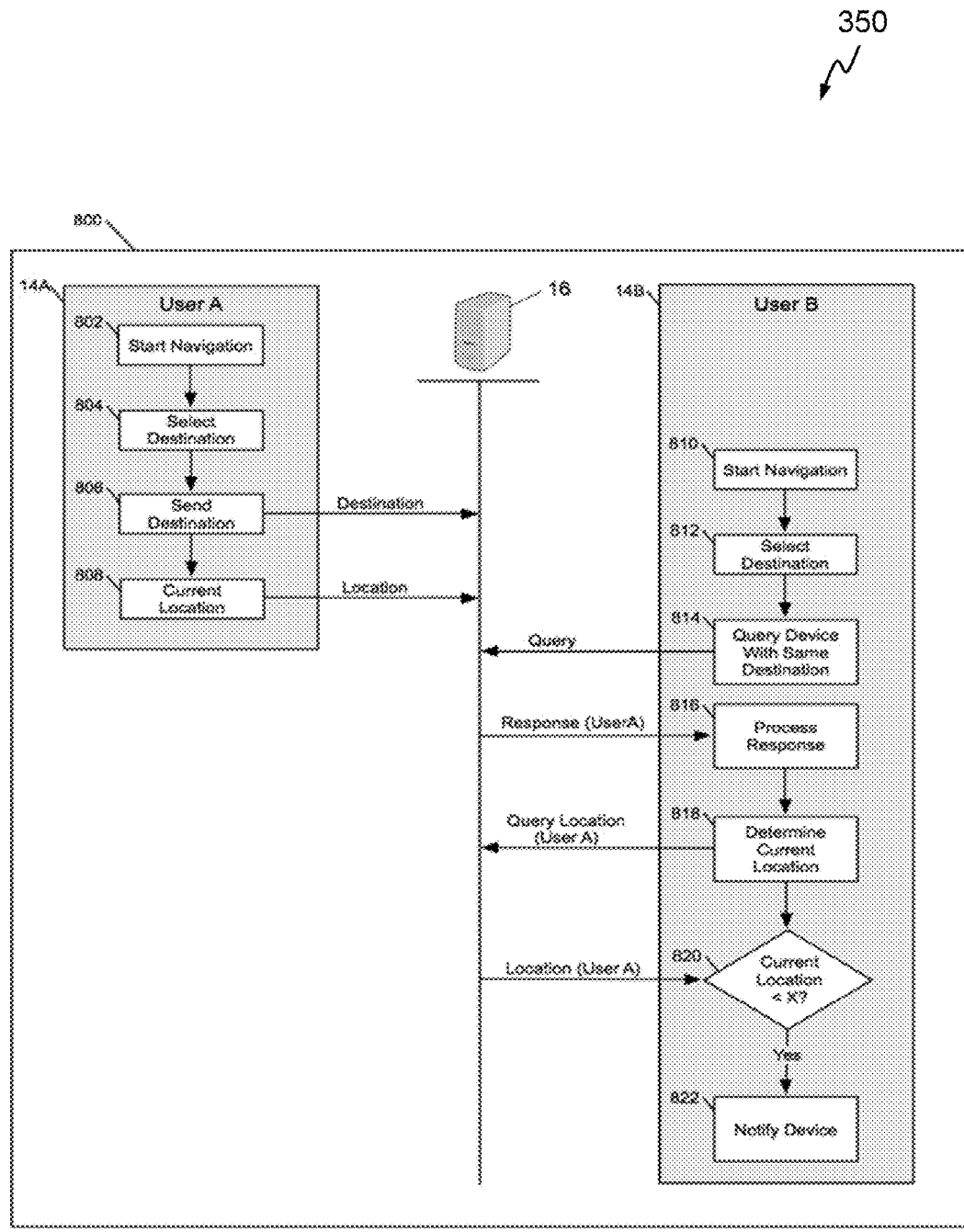
FIG. 3 illustrates an example of two separate user devices communicating navigation information to a server according to example examples.

FIG. 3 illustrates a message flow among multiple users of a navigation application. In one example, a user of the current application (user B) sets a destination in a navigation application executing on the device of the user 12 and/or the transport 14. The application seeks one or more users (user A) of the application that have determined the same or similar route and/or destination. Users of the application whom had set the same or similar destination are queried and the locations of both users are determined. The comparing of both users' destinations may be determined in the current application executing on the user's device 12 and/or the transport 14, or may be determined in logic contained in the remote server 16 such that communication via messaging occurs between the remote server and the current application executing on the user's device 12 and/or the transport 14. If the delta distance between the two user devices is within a determined threshold distance, a notification is set to the user's device to alert the user. The user may wish to follow the other user to the destination, or may wish to follow the user for a portion of the route to the destination, or may wish to recommend stopping at a particular location along the route, etc.

In FIG. 3, the communication session 800 includes user B 14B and user A 14A both beginning to use the navigation application 802/810. Destinations are selected in the navigation application 804/812 so a destination is selected and/or input into the application. The navigation is calculated by the application and the user begins the route to the determined destination. Communication 806 between the navigation application and a remote server 16 includes communication through a network 120 with messaging occurring through server 16 to a client optionally passing through a network such as the Internet.

In another example, users of the current application may also send their current destination to a remote server. In yet another example, the frequency of time may be a static period, such as every minute, or a variable period, such as when the current destination is X number of units, for example, feet/yards/miles from the previously sent destination. The setting of the configuration elements occurs in a configuration module in the current application executing on the device 12 and/or the transport 14 and the current application executes in a device containing a processor and memory connected to the transport.

The configuration module permits various elements to be configured by the user and may be executed via navigational elements of the current application. The configuration module may be run upon initialization of the current application for the first time and/or may be navigated via navigational elements of the current application such as a GUI menu system. Data that is configured in the configuration module may be stored locally and/or stored remotely, such as in the remote server 16 and/or the database 18 and may be retained by the current application through messaging normally utilized in inter-process and/or intra-processing messaging.

Figure 4:
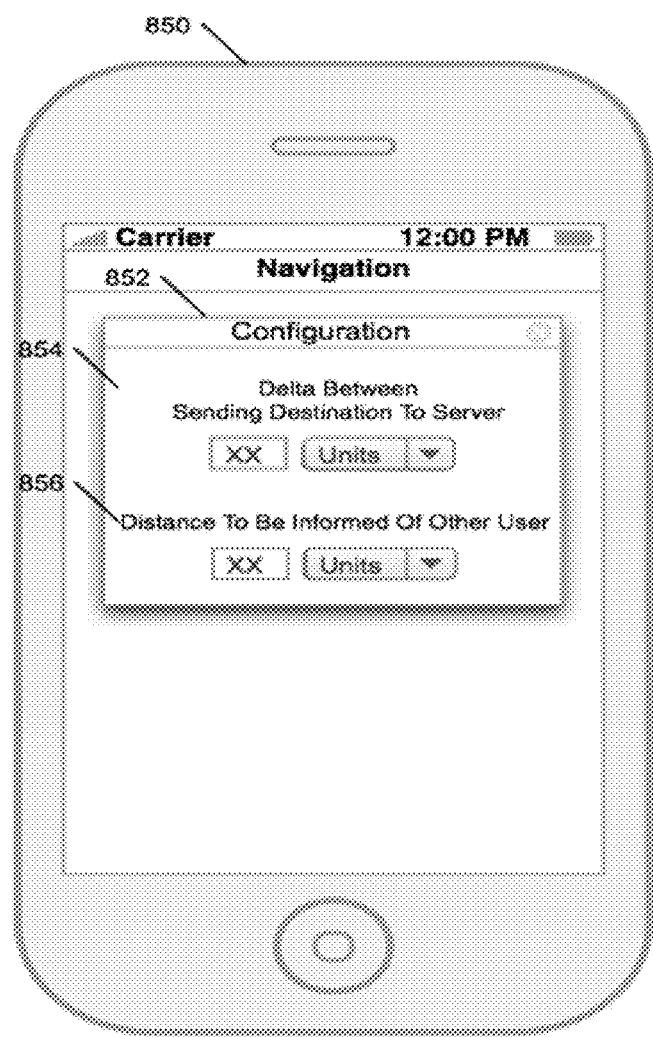
FIG. 4 illustrates a user interface for customizing user navigation settings according to example examples.

As an example, the interface of FIG. 4 depicts a configuration module executing on a mobile device 12. The mobile device 12 is executing on the configuration application in one possible implementation of the current application 850. There are two configurable elements displayed in the configuration window 852 allowing the user to input specific data for the configurable elements. The first element 854 is the amount of time between the sending of the device's destination to a remote server 16. This permits the modification of the rate that the user's destination is sent to the server. There are two components, a text entry component where a number is input, and a dropdown component, which is the unit type. The items in the dropdown component may be: seconds, minutes, hours, days, etc. The second element 856 is the amount of distance, and the device may send a message to the remote server 16, such as the query message 814. This permits the configuration of the precise distance between the device and a user of the current application that may be traveling to the same or a similar destination, or who is on the same or similar route as the current device. There are two components, a text entry component where a number is input, and a dropdown component, which is the unit type. The items in the dropdown component may be: feet, yards, miles, etc.

The remote server 16, in this scenario, retains the data pertaining to each of the users of the application, and may be queried for any and/or all data of the current and/or past users of the system. In an alternate example, data may also be stored not locally in the remote server, but in a communicably coupled, database 18 so communication between the remote server 16 and the database occurs through normal messaging. Additionally, the database may be a structured query language (SQL) database, or any similarly organized structure of data that data may be stored and/or queried in a table structure inside the database.

In FIG. 3, the application may begin to update the remote server with the current location within the route to the determined destination 808. All users may alternately perform this update and messaging occurs between the device of the user in the navigation and the remote server and the messaging may also be routed through a network 120. In yet another alternate example, the querying of the location may occur before the sending of the destination 806/812. After the destination is selected 812, either directly after, or at a period of time, the application queries the remote server 16 seeking other users that currently have the same or a similar destination 814. As a result, a query message is sent from the application of the user's device 12, to the remote server 16 wherein messaging may occur through the network 120. Alternately, messaging may occur between the remote server 16 and a database 18.

A response message is returned 816 with any current users with the same or s similar destination as the current user (User B) destination. In this example, user A's route and/or destination is found to match the destination of user B, and the response message contains the data pertaining to user A. This data may include user A's current location within the navigation, or alternately this data may be queried 818 via a message to the remote server 16. Other data may be included in the response message including the information related to the transport such that a user may be able to visually locate the transport (i.e. make/model/year of the transport, the color of the transport, the license plate number, etc.). A response to the query location is returned to the calling application containing the current geographic location of the device within or not within the route to the previously determined destination. A check is made 820 to determine if the current location (User B) and the other location (User A) is within a determined delta and whether the delta is the distance that the user may be able to visually locate the other transport. If the delta is less than the determined maximum distance, a notification is made 822 on the device so the user is notified to look for the other user (User A) and that the user is on a route to the same destination.

A next level of functionality is available to assist the user in navigation by providing data to the user's devices permitting the ability to contact one another when it is determined that both users of different devices and transports are heading to the same route and/or destination. In this example, the contact information is sent to the user's devices when it is determined that both navigation devices are heading to the same route and/or destination and are within a determined distance from each other.

Figure 5:
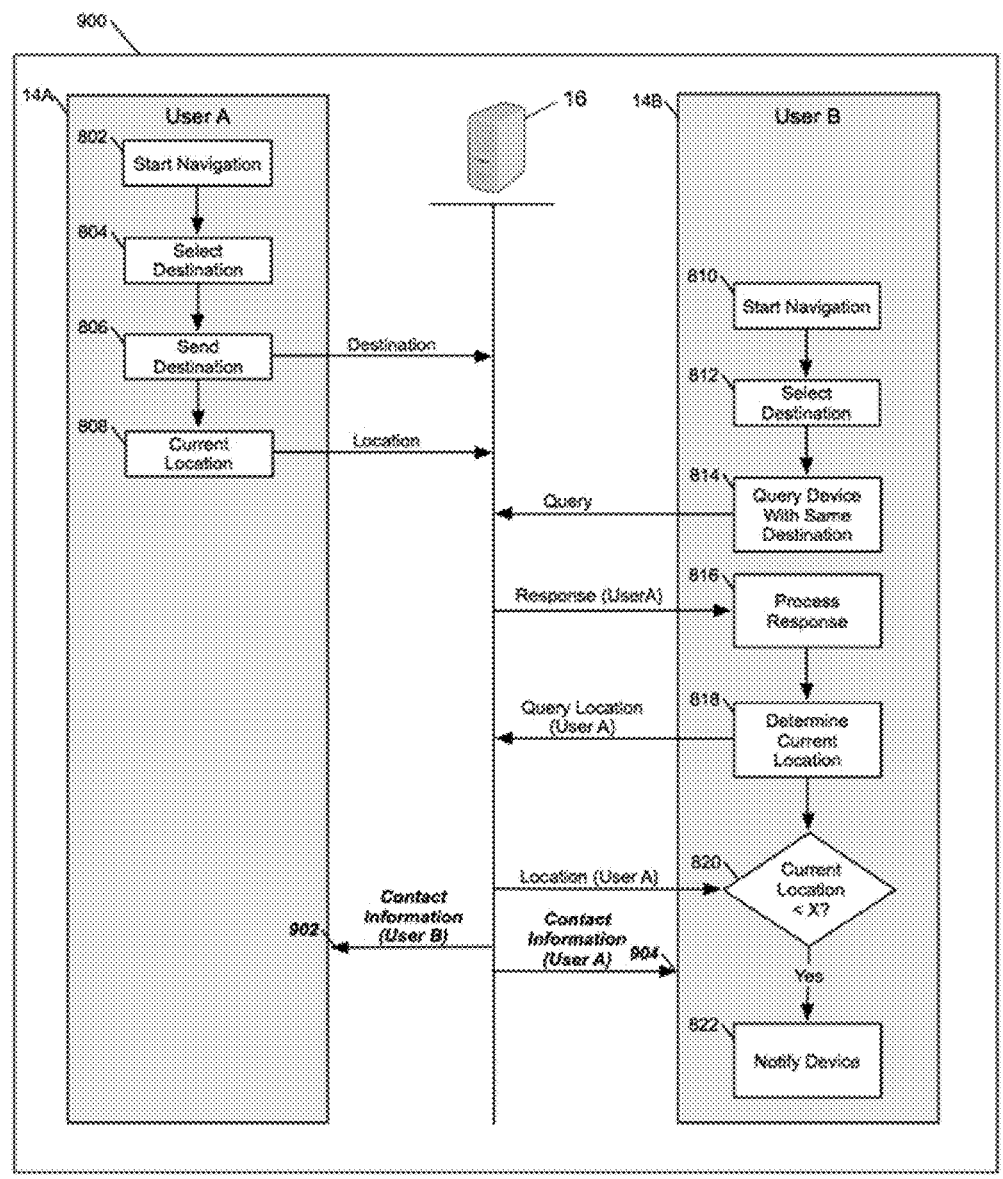
FIG. 5 illustrates a logic flow diagram of two user devices sharing navigation information to a server according to example examples.

FIG. 5 is an updated message flow 900 depicting the server updating the user devices with respective contact data, permitting them to contact each other during a navigation session. The contact information 902/904 is sent from the remote server 16 to each respective user after it is determined that both users are navigating to the same or similar destination and are within a determined distance from each other and have the preference enabled to receive such information regarding other users.

The contact information may include: name, mobile number, destination, details of the transport, reason for heading to the destination, length of time at the destination, itinerary at the destination, etc. This data may be stored in the remote server 16 or a coupled database 18. The data may be obtained by the user of the current application upon entering the destination into the application or may be obtained in an initialization of the application.

Figure 6:
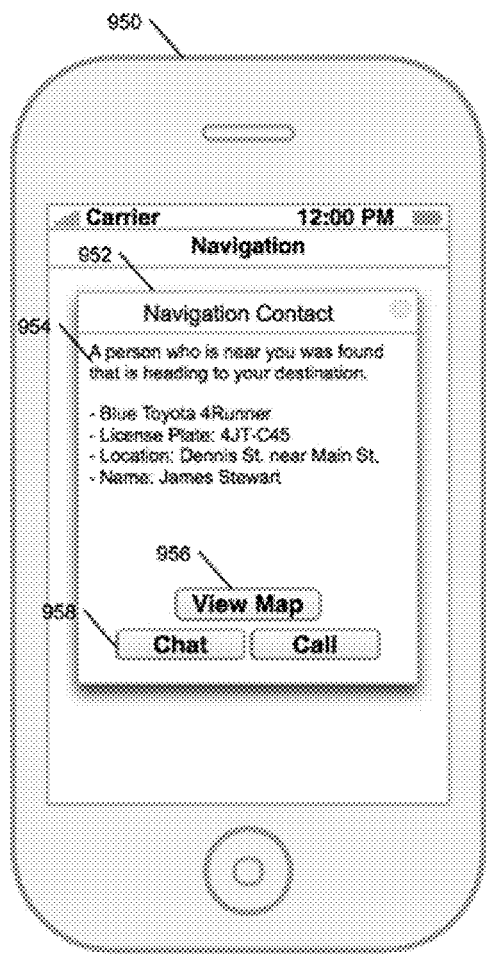
FIG. 6 illustrates a user interface for receiving other user navigation information according to example examples.

FIG. 6 is a notification displayed on the display of a mobile device as one example of an implementation of the current application 950. The device illustrates a navigation application executing and a popup window 952 displayed with the title "Navigation Contact" indicating that the window pertains to a contact in the navigation application. Text in the window explains that the application found another user with the same or a similar destination of the current destination 954. Details of the user follows detailing the type of transport, the license plate number, the current location of the user, and the name of the user. Other details may be present including other details of the user without deviating from the scope of the current application. Buttons on the bottom of the window permit for further interaction by the user and the buttons may be pressed by a pointing device, such as a finger or via any other manner, such as using voice, gesture, etc. The data necessary to execute the functionality when any of the buttons are pressed by the user is received via a central server, for example the remote server 16 and/or the database 18. Messaging between the remote server and the device 12 may occur so data is retrieved from the remote server/database and may be routed through the network 120. A "View Map" button 956 permits the user to view a map of the current location with icons present for both the user's location and the location of the contact. A "Chat" and "Call" button 958 permits the user to directly connect with the contact via a message to the contact and the current chatting application is presented with the contact's number, or a direct call to the contact.

In another example, the two transports may communicate with one another through a system and method disclosed with the two transports being the transport of the user of the current application (user 1), and the transport of the determined contact who is traveling to the same or similar geographic location (user 2).

Figure 7:
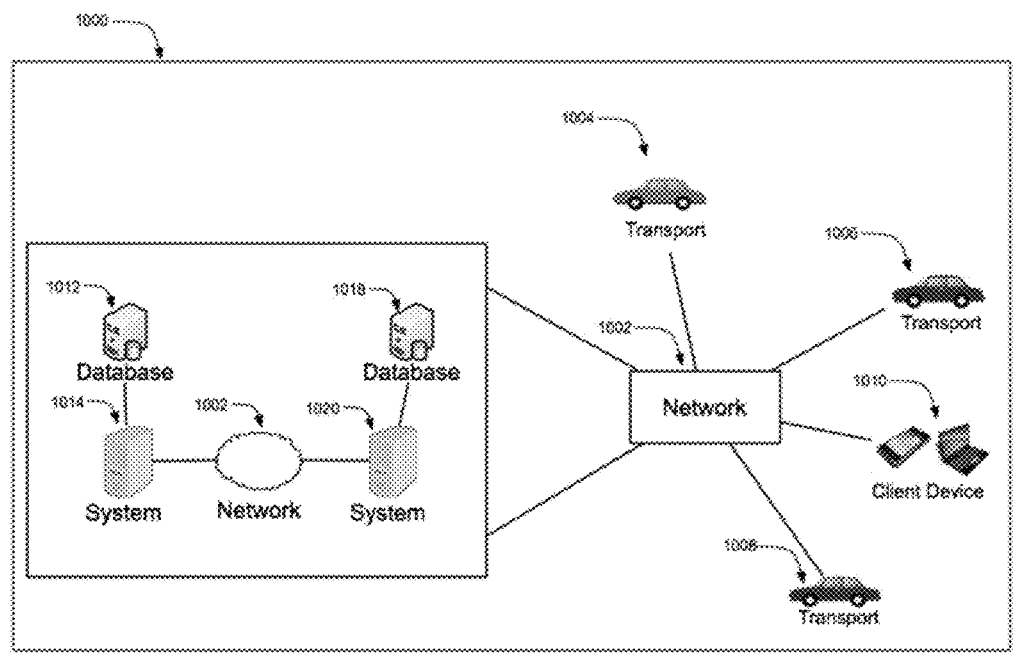
FIG. 7 illustrates a network diagram of transports operating with a navigation network according to example examples.

FIG. 7 illustrates, in one example, another system diagram of the present application 1000 depicting a system for vehicle-to-vehicle communication. The present application permits a user utilizing an application currently executing on the transport, which includes one or more of a transport 1004, 1006, 1008 and/or one or more of any other transport that regularly transports human beings referred to as a transport. The client device 1010 may be a mobile device or a more traditional computer, such as a desktop, laptop, or may be a tablet computer, eBook reading device, mp3 player or any such device with a processor, memory and display. The application in the form of software, for example, may be downloaded from the network 1002 to the transport and/or client device 1010. The elements in the system may include fewer or greater components or different components, such as wired or wireless electronic devices such as clients, servers, phones, tablets and computers as well as various Networks such as the Internet, intranets and public and private networks, without departing from the scope of the present invention. The capability may be inherent in the client device 1010, and/or the transport in the form of hardware, software, and/or firmware. The transports, 1004/1006/1008 and client devices 1010 are connected to the network 1002. It should be noted that other types of devices, in addition to devices depicted might be used with the present invention. For example, a PDA, a tablet computer, a laptop, an MP3 player, a gaming device (such as a hand held system or home based system) and the like (including a P.C. or other wired device) that may also transmit and receive information could be used with the present application. The user of the application will interface with the transport 1004/1006/1008 and/or client device connected through the network 1002. The network 1002 may be redundant or may be more than a single entity without deviating from the scope of the application. The network 1002 further includes a system 1014 communicably coupled to the network 1002 and a database 1012. Also, one or more system(s) 1020 may be communicably coupled to the network 1002 and a database 1018.

The application resides completely or partially on the transport 1004/1006/1008 and/or the client device 1010, which may be a transport and/or a mobile device, but may also reside on a user's desktop computer, a personal digital assistant (PDA), tablet computer, or any other device containing a processor, memory, and an operating system. In addition, the application may reside either completely or partially on any one of the other elements in the system depicted in FIG. 1, for example, the system 1014/1020, the database 1012, 1018 and/or the network 1002. Database 1012/1018 is directly connected to the system 1014/1020, may be a part of (co-located with the system 1014/1020) or connected remotely through the network 1002 without deviating from the scope of the application. If the application resides on a client device 1010, the application may be downloaded through a platform, such as an application store or market residing on the device or accessed via the device. The user interacts with the application executing on the transport 1004/1006/1008 and/or the client device 1010 via a pointing device, a computer keyboard, finger, hand, gesture, speech, eye or iris control or any other commonly used input devices.

A next level of map assistance establishes a communication between the users of both transports when it is determined that a transport is heading to the same destination as the current user, and is potentially nearby the current location of the current user. This communication is brought to a next level of interaction. In this example, functionality is introduced that permits the vehicles to communicate. This communication is sought by attempting a connection between the two transports, and once acknowledged, 2-way communication can be established so the two occupants could communicate via voice, text, and/or other communication mediums.

Figure 8:
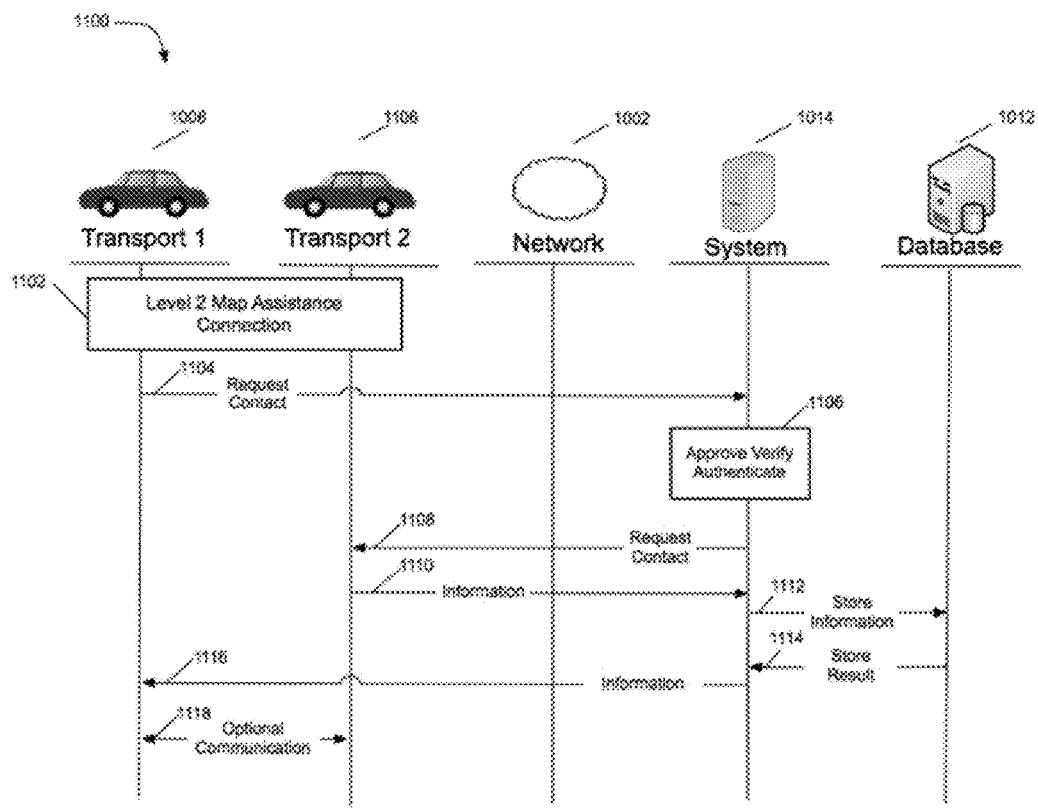
FIG. 8 illustrates a system communication diagram of multiple transport navigation according to example examples.

FIG. 8 illustrates a possible implementation of message communications 1000 between the current transport (Transport 1 1008) and another transport in a near geographic location (Transport 2 1006). In this example, a "Request Contact" message 1004 is sent to the system 1014. This message is routed to the system through the network and the system contains the functional hub of communication. This hub can be one or more of any of the components in the network 1002, the system 1014/1020 and/or the database 1012/1018. In one example, transport 1 has sensors including multiple radars mounted on the front and rear bumpers permitting the transport to "see" upcoming traffic as well as a camera positioned near the rear-view mirror and/or the rear of the vehicle locating and recording the surrounding area. The cameras locate other transports in the near geographic area and their location and distance are constantly monitored and updated to establish proximity between transports.

In another example, the sensors may assist in connecting vehicle 'A' and vehicle 'B' ('VA' and 'VB') together. The navigation application may correlate between GPS executing on both devices related to VA and VA to determine location data. In this example, sensors on the vehicles may be utilized to "see" the surrounding traffic and detect the other vehicle(s), in a similar manner as the sensors are used today to observe an oncoming vehicle that has stopped by engaging the braking system automatically. As another example, the sensors may be used to verify the location of the other vehicle that has been "connected" with the current vehicle via connection and correlation procedures (i.e., GPS). For example, sensors in VA sense VB, which according to the GPS coordinates should be arriving in the left lane passing VA in a predetermined amount of time. The sensors validate the location of VB and therefore permit VA to follow VB with a higher level of assurance.

In one example, the communication between the transports uses a 5.9 GHz bandwidth radio frequency. This permits constant communication with transports within a 1000 foot radius of the transport. 5.9 GHz communication, otherwise referred to in the industry as dedicated short-range communications, or intelligent transportation systems (ITS), is used as one-way or two-way short-range to medium range wireless communication specifically designed for automotive use. For example, ITS may be used between VA and VB, permitting communication between the passenger's mobile devices and/or to provide real-time connectivity to all system users in VA and/or VB. Some of the features of ITS include, but are not limited to, active safety transportation applications, secure and reliable communications, fast communication speed with low latency, invulnerability to extreme weather, tolerance of multi-path transmissions, and technology based on standards to enable interoperability. Other communication frequency bands and distances are possible without deviating from the scope of the current application.

In this example, transport 1 1008 has connected at a navigation level with transport 2 1106 via operation 1102. This permits the user to establish communication between the two transports. The user in transport 1 attempts to establish contact with transport 2 by selecting transport 2 on a touchscreen. This touchscreen displays surrounding transports including both those that are in the same geographic location and those that are in the same geographic location and which have opted-in for communication. This "opt in" configuration preference is stored in the system and is configured by the user of the transport at configuration time. The configuration permits the user to specify the preferences permitting for communication with other transports. The configuration element(s) are sent to the system and can be stored in the internal memory of that entity and/or stored in the connected database.

The vehicle also carries other sensors, which may include radars mounted on the front and rear bumpers that permit the transport to identify traffic on freeways. Cameras positioned near the rear-view mirror and the rear of the vehicle detect traffic lights. A GPS and inertial measurement unit and wheel encoder can be used to determine the vehicle's location and keep track of its movements. The system device 1014, upon reception of the "Request Contact" message 1104, executes a method which approves, verifies, and/or authenticates the request 1104. The Approve/Verify/Authentication process 1106 includes determining the configuration preferences of the transport(s). The system server 1014 may obtain the information stored locally, or may query the database to determine the preference characteristics. Assuming that transport 2 is configured to accept the communication, the system 1014 sends a "Request Contact" message 1108 to transport 2 1106. This message is routed through the network 1002 and routed to transport 2. Transport 2 receives the incoming "Request Contact" message 1108 and may automatically respond by sending an "Information" message 1110 to the system 1014 server.

In an alternate example, the user of transport 2 may also be advised of an incoming communication request by alerting the user either by speech, text, a notification on a device viewable by the user or any other method regularly utilized to notify a user of a transport an incoming message. The system 1014 stores the information in the database 1012 by sending a "Store Information" message 1112 to the database. In an alternate example, the information is stored locally in the system 1014 without the need to message an external database.

The database 1012 responds by sending a "Store Result" message 1114 message to the system 1014. This message may include a result value so the system can determine that the information was successfully stored in the database. The system then sends the information received in the "Information" message 1116 to transport 1. This message is routed through the network to transport 1. As a result, transport 1 and transport 2 have established communication and messages 1110, 1112, 1114, and 1116 may be repeated as necessary. Also, information message(s) may be directly sent from transport 1 to transport 2 as well (not depicted). In an alternate example, a direct connection between transport 1 and transport 2 may be established permitting the two transports to communicate directly without the need to involve the system. This optional communication is depicted by the "Optional Communication" message 1118. As an example, the user of the current application is driving a transport 14 or is a passenger in an autonomous transport. The transport's navigation system is currently navigating the transport to a determined destination. The current application obtains the destination of the user via interaction with the navigation system of the transport 14 and/or the device 12, and queries one or more of the elements in the system 10, for example the remote server 16, for any other transports that may be currently traveling to the same or a similar destination.

The current application receives data from the remote server 16, indicating there is another transport in the same or similar geographic location heading to the same or a similar destination. A notification is sent to the device 10 and/or the transport 14 that informs the user of the details of the transport of the other user (i.e., make, model, color, etc.) and contact information so the user may be able to contact (via email/message/chat/voice/etc.) the other user device. The current application also establishes vehicle-to-vehicle communications with the other user device so the users may establish further contact via voice, text, and/or other communication avenues. The current application connects transports, permitting for communication between the riders in the transport.

The current example permits the riders in the transport to be connected to the most appropriate riders in other transports. For example, one transport may have 3 riders: rider 1A, rider 1B, and rider 1C and rider 1A is a male 40 years old, rider 1B is a female 38 years old, and rider 1C is a female 16 years old. Another transport that has been connected to the first transport has 2 riders: rider 2A is a female 42 years old, and rider 2B is a female 15 years old. The application may attempt to connect the riders of the same sex and age when establishing contact between the two transports through messages, voice, or vehicle-to-vehicle communication. To determine the compatibility of the riders, the system 10 may analyze data input, such as video, audio, etc., and the like and the sex and age may be closely determined. Upon an establishment of the connection of the two transports, the system 10 may further attempt to connect the riders of similar characteristics. To determine the characteristics of riders in a transport, the transport 14 may utilize a camera placed inside the transport and audio and/or video is captured and recorded. The recorded data may be stored in one or more of the elements in the system 10, such as the transport memory. Analysis of the data permits the transport to ascertain the approximate age and/or sex of each of the riders in the transport. This may occur through audio analysis tools, such as provided by CMU SPHINX a leading open-source speech recognizer.

In another example, the transport may be further aware of each of the riders in the transport by gaining access to the rider's mobile device connected to the transport, such as through the BLUETOOTH protocol and a rider may establish a connection to the transport to permit voice calls and media streaming. This connection permits the transport to obtain musical tastes of the rider and potentially identify an understanding of the messages, voice calls, etc., of the rider while connected to the transport. Through an understanding of the characteristics of the users, the system may attempt to connect riders of similar characteristics when making vehicle-to-vehicle connections.

Figure 9:
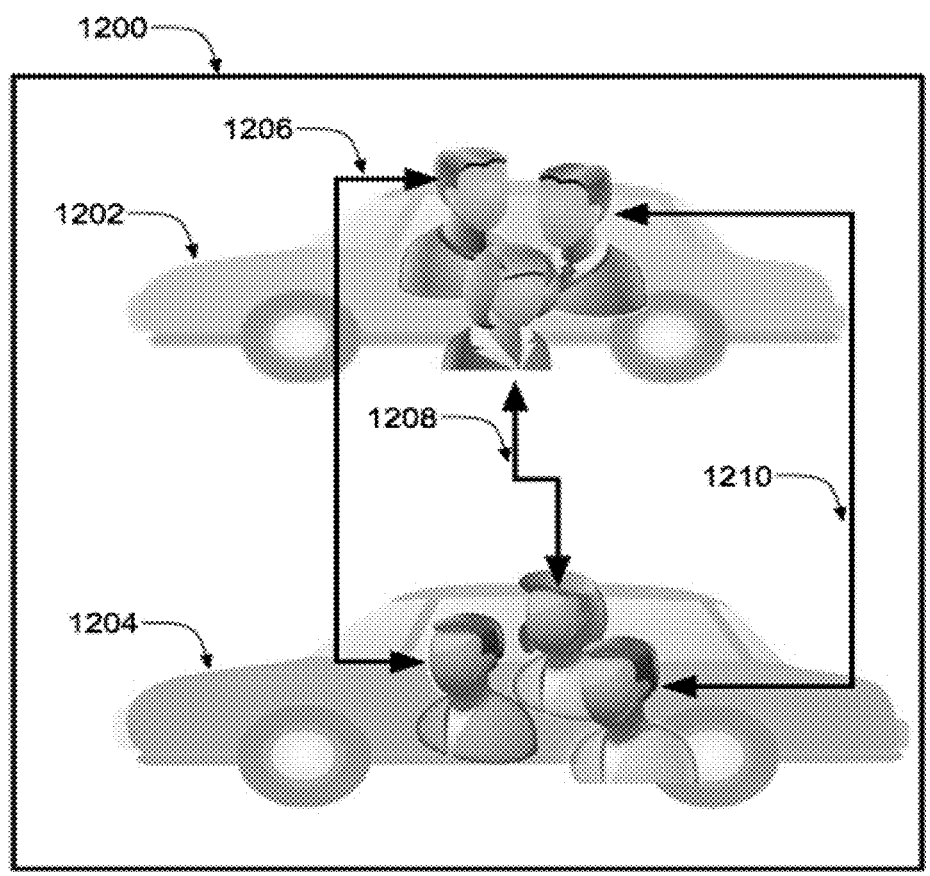
FIG. 9 illustrates a communication session among users in a transport according to example examples.

FIG. 9 illustrates the connections between riders in transports 1200 in one possible implementation of the current application. The two transports 1202 and 1204 have been "connected". The transports 1202, 1204 have determined through analysis of the transports' audio/video/device connection, etc. that two males are most compatible 1210, the two females are most compatible 1208, and the other 2 males are most compatible 1206. In another example, the contact information for the rider may be provided to the rider in the other transport whom is most compatible. This contact information may be provided ahead of time by one or more of the riders to the transport through a configuration module, or be determined by accessing the rider's device wherein that device is connected to the transport via a wired or wireless protocol, such as Bluetooth.

Figure 10:
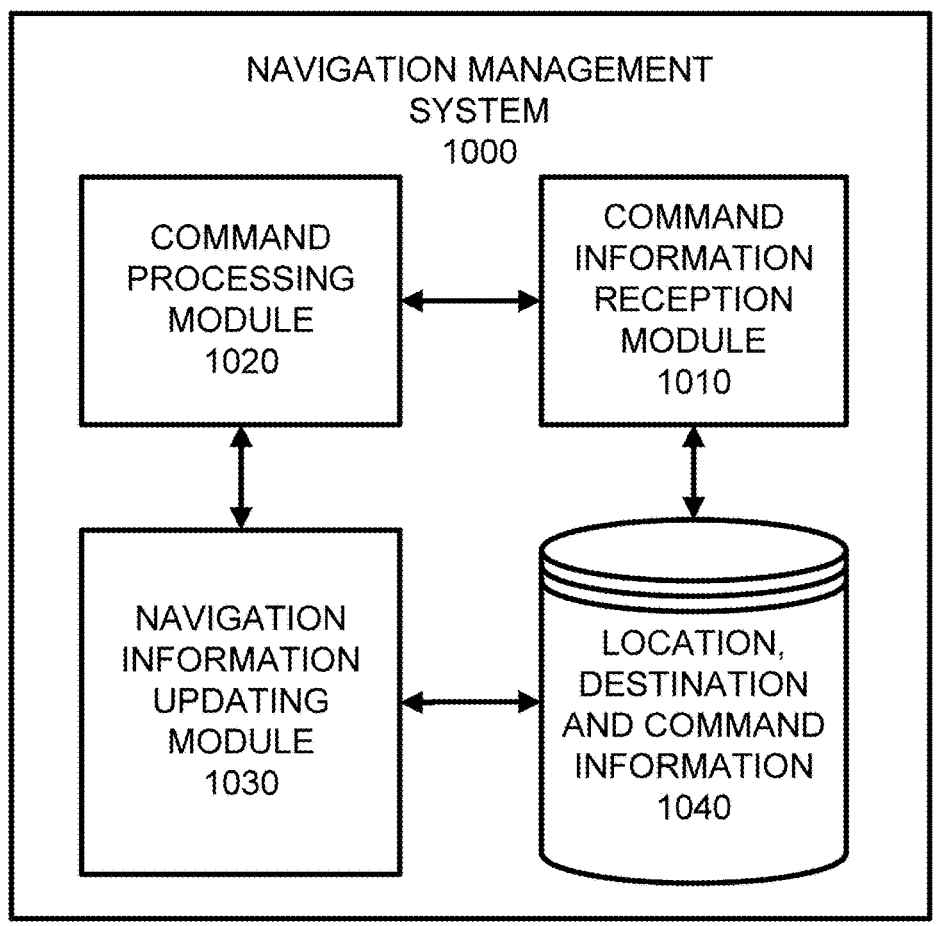
FIG. 10 illustrates a system configuration configured to perform one or more of the example examples of the present application.

FIG. 10 illustrates a system configuration 1000 of a computer, server or set of computing devices. The system may be used to identify navigation routes based on received input data. One example method of operation may include receiving location and destination information via the information and command reception module 1010. The command and location processing module 1020 may include a computing unit or device that compares the location and user characteristic data to a predefined condition stored in memory. The system also includes determining whether the user characteristics can be used to match an intermediate location via the location and command update module 1030. All information received and used to process such determinations may be stored in the information database 1040.

The system 1000 may perform a method that includes initiating a navigation application on a first user device, identifying at least one destination of the navigation application via the information reception module 1010, notifying a remote server of the at least one destination via the processing module 1020, receiving a first query from a second user device inquiring about the at least one destination, and transmitting a response including an identification of a first user profile associated with the first user device to the second user device via the update module 1030.

The response further includes a notification that the first user profile is attempting to navigate to the at least one destination. The method may also include receiving a second query from the second user device inquiring about a current location of the first user device, determining whether the current location of the first user device is within a threshold distance from a current location of the second device, and when the first user device is within the threshold distance, establishing a communication session between the first user device and the second user device. The method may also include retrieving the first user profile and determining a first user preference of the first user profile to share navigation information with other user profiles during navigation sessions, and retrieving a second user profile associated with the second user device and determining a first user preference of the second user profile to share navigation information during navigation sessions. The method may also include identifying the threshold distance associated with at least one of the first user profile and the second user profile, and determining the threshold distance is within a preference distance associated with the at least one of the first user profile and the second user profile. The identification of the first user profile comprises at least one of a name, number, destination, transport information, purpose for traveling, length of time of trip, and itinerary of trip.

Another method may include initiating a navigation application on a first user device, identifying at least one destination of the navigation application, notifying a remote server of the at least one destination, updating a first user profile to include the at least one destination, searching for at least one additional user profile associated with at least one additional user device with a matching destination; and transmitting a notification to the first user device of the at least one additional user profile. The notification includes a transport description and another destination that is the same as the at least one destination or is within a predefined distance of the at least one destination. The method may also include retrieving at least one user profile of the first user device and at least one user profile of the second user device, and identifying at least one match between the user profiles. The method may also include establishing a chat session between the first user device and the second user device responsive to identifying the at least one match, receiving sensor information from at least one sensor disposed on a first transport carrying the first user device, and determining a second transport carrying the second user device is within a predefined distance of the first transport. The sensor information includes radio signals. The method may also include transmitting the sensor information identified via the first transport to the second user device.

The operations of a method or algorithm described in connection with the examples disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 11 illustrates an example network element 1100, which may represent any of the above-described network components, etc.

Figure 11:
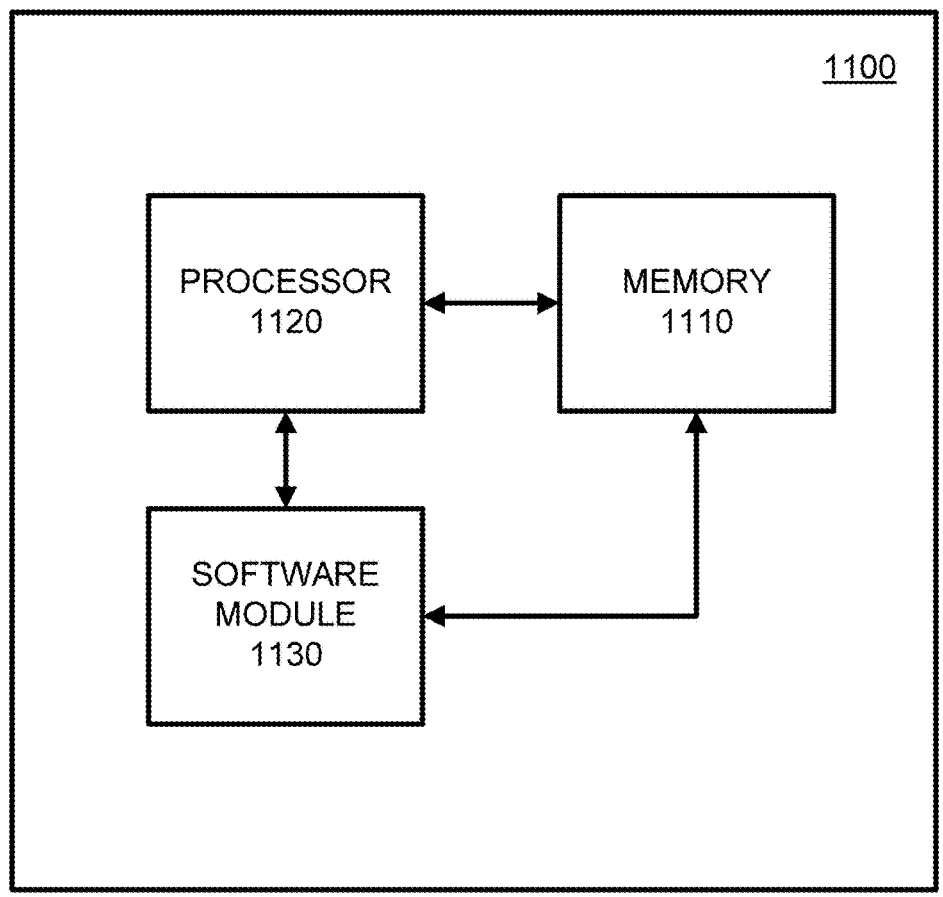
FIG. 11 illustrates an example network entity device configured to store instructions, software, and corresponding

As illustrated in FIG. 11, a memory 1110 and a processor 1120 may be discrete components of the network entity 1100 that are used to execute an application or set of operations. The application may be coded in software in a computer language understood by the processor 1120, and stored in a computer readable medium, such as, the memory 1110. The computer readable medium may be a non-transitory computer readable medium that includes tangible hardware components in addition to software stored in memory. Furthermore, a software module 1130 may be another discrete entity that is part of the network entity 1110, and which contains software instructions that may be executed by the processor 1120. In addition to the above noted components of the network entity 1100, the network entity 1100 may also have a transmitter and receiver pair configured to receive and transmit communication signals (not shown).

Although an exemplary example of the system, method, and computer readable medium of the present application has been illustrated in the accompanied drawings and described in the foregoing detailed description, it will be understood that the application is not limited to the examples disclosed, but is capable of numerous rearrangements, modifications, and substitutions without departing from the spirit or scope of the application as set forth and defined by the following claims. For example, the capabilities of the system of FIG. 10 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many examples of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the examples is not intended to limit the scope of the application as claimed, but is merely representative of selected examples of the application.

One having ordinary skill in the art will readily understand that the application as discussed above may be practiced with steps in a different order, and/or with hardware elements in configurations that are different than those which are disclosed. Therefore, although the application has been described based upon these preferred examples, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred examples of the present application have been described, it is to be understood that the examples described are illustrative only and the scope of the application is to be defined solely by the appended claims when considered with a full range of equivalents and modifications (e.g., protocols, hardware devices, software platforms etc.) thereto.

What is claimed is:

1. A method comprising:
   initiating a navigation application on a first user device associated with a first user profile having a set of first user characteristics;
   identifying at least one destination of the navigation application;
   notifying a remote server of the at least one destination;
   receiving a first query from a second user device inquiring about the at least one destination, the second user device associated with a second user profile having a set of preferred user characteristics; and
   transmitting a response comprising an identification of the first user profile associated with the first user device to the second user device when the set of first user characteristics matches the set of preferred user characteristics;
   wherein a first user preference of the first user profile is determined to share navigation information with other user profiles during navigation sessions; and
   wherein a first user preference of the second user profile is determined to share navigation information during navigation sessions.

2. The method of claim 1, wherein the response further comprises a notification that the first user profile is attempting to navigate to the at least one destination.

3. The method of claim 1, further comprising:
   receiving a second query from the second user device inquiring about a current location of the first user device.

4. The method of claim 3, further comprising:
   determining whether the current location of the first user device is within a threshold distance from a current location of the second user device; and
   when the first user device is within the threshold distance, establishing a communication session between the first user device and the second user device.

5. The method of claim 4, further comprising:
   identifying the threshold distance associated with at least one of the first user profile and the second user profile; and
   determining the threshold distance is within a preference distance associated with the at least one of the first user profile and the second user profile.

6. The method of claim 1, wherein the identification of the first user profile comprises at least one of a name, number, destination, transport information, purpose for traveling, length of time of trip, and itinerary of trip.

7. An apparatus, comprising:
   a processor configured to:
   initiate a navigation application on a first user device associated with a first user profile having a set of first user characteristics;
   identify at least one destination of the navigation application;
   notify a remote server of the at least one destination;
   a receiver configured to receive a first query from a second user device inquiring about the at least one destination, the second user device associated with a second user profile having a set of preferred user characteristics; and
   a transmitter configured to transmit a response comprising an identification of the first user profile associated with the first user device to the second user device when the set of first user characteristics matches the set of preferred user characteristics;
wherein a first user preference of the first user profile is determined to share navigation information with other user profiles during navigation sessions; and
wherein a first user preference of the second user profile is determined to share navigation information during navigation sessions.

8. The apparatus of claim 7, wherein the response further comprises a notification that the first user profile is attempting to navigate to the at least one destination.

9. The apparatus of claim 7, wherein the receiver is further configured to receive a second query from the second user device inquiring about a current location of the first user device.

10. The apparatus of claim 9, wherein the processor is further configured to
determine whether the current location of the first user device is within a threshold distance from a current location of the second user device, and
when the first user device is within the threshold distance, the processor establishes a communication session between the first user device and the second user device.

11. The apparatus of claim 10, wherein the processor is further configured to
identify the threshold distance associated with at least one of the first user profile and the second user profile, and
determine the threshold distance is within a preference distance associated with the at least one of the first user profile and the second user profile.

12. The apparatus of claim 7, wherein the identification of the first user profile comprises at least one of a name, number, destination, transport information, purpose for traveling, length of time of trip, and itinerary of trip.

13. A non-transitory computer readable storage medium configured to store instructions that when executed cause at least two processors to:
initiate a navigation application on a first user device associated with a first user profile having a set of first user characteristics;
identify at least one destination of the navigation application;
notify a remote server of the at least one destination;
receive a first query from a second user device inquiring about the at least one destination, the second user device associated with a second user profile having a set of preferred user characteristics; and
transmit a response comprising an identification of the first user profile associated with the first user device to the second user device when the set of first user characteristics matches the set of preferred user characteristics;
wherein a first user preference of the first user profile is determined to share navigation information with other user profiles during navigation sessions; and
wherein a first user preference of the second user profile is determined to share navigation information during navigation sessions.

14. The non-transitory computer readable storage medium of claim 13, wherein the response further comprises a notification that the first user profile is attempting to navigate to the at least one destination.

15. The non-transitory computer readable storage medium of claim 13, wherein the at least two processors are further configured to:
receive a second query from the second user device inquiring about a current location of the first user device.

16. The non-transitory computer readable storage medium of claim 15, wherein the at least two processors are further configured to perform:
determine whether the current location of the first user device is within a threshold distance from a current location of the second user device; and
when the first user device is within the threshold distance, establishing a communication session between the first user device and the second user device.

17. The non-transitory computer readable storage medium of claim 16, wherein the at least two processors are further configured to perform:
identify the threshold distance associated with at least one of the first user profile and the second user profile; and
determine the threshold distance is within a preference distance associated with the at least one of the first user profile and the second user profile, wherein the identification of the first user profile comprises at least one of a name, number, destination, transport information, purpose for traveling, length of time of trip, and itinerary of trip.

* * * * *